Dec. 5, 1961 G. KIRSCHEY 3,011,363
FRICTION WHEEL DRIVE
Filed July 21, 1959 3 Sheets-Sheet 1

INVENTOR
Gerhard Kirschey

United States Patent Office 3,011,363
Patented Dec. 5, 1961

3,011,363
FRICTION WHEEL DRIVE
Gerhard Kirschey, Waldernbach ueber Weilburg, Lahn, Germany
Filed July 21, 1959, Ser. No. 828,488
2 Claims. (Cl. 74—796)

The present invention relates to a friction wheel drive with double beveled wheels, which are in engagement between two inner and outer rings.

Drives of this type are known in which the friction wheels are immovably mounted.

It is an object of the present invention to provide a friction wheel drive in which the friction wheels are mounted in swinging members on a freely movable ring and bolts secured to a driven disc which is connected with a driven shaft engage the swinging members, so that in addition to the tangential drive of the driven parts, a radial component of the force depending upon the turning moment is created for an enforcement of the closed system of the mechanical forces between the friction wheels and the outer rings at the engaging points.

It is another object of the present invention to provide a friction wheel drive wherein the outer rings are supported relative to the drive housing by a moment coupling and exert, thereby, an axial engagement force dependent upon the size of the reaction rotary moment, whereby the change of the ratio of the transmission may be provided by rotation of the outer rings by means of known adjusting organs as levers or screws.

With these and other objects in view, which will become apparent in the following detailed description, the present invention will be clearly understood in connection with the accompanying drawings, in which.

Figure 1:
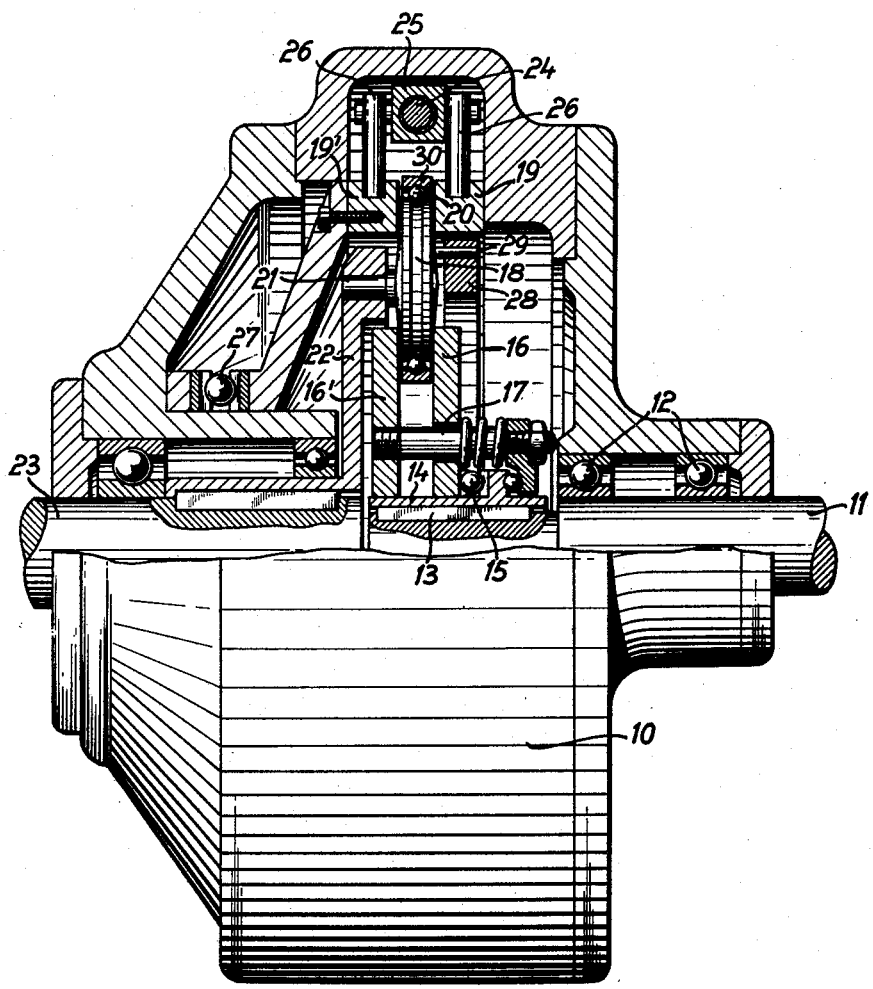
FIGURE 1 is a front elevation of the drive partly in section.
Figure 2:
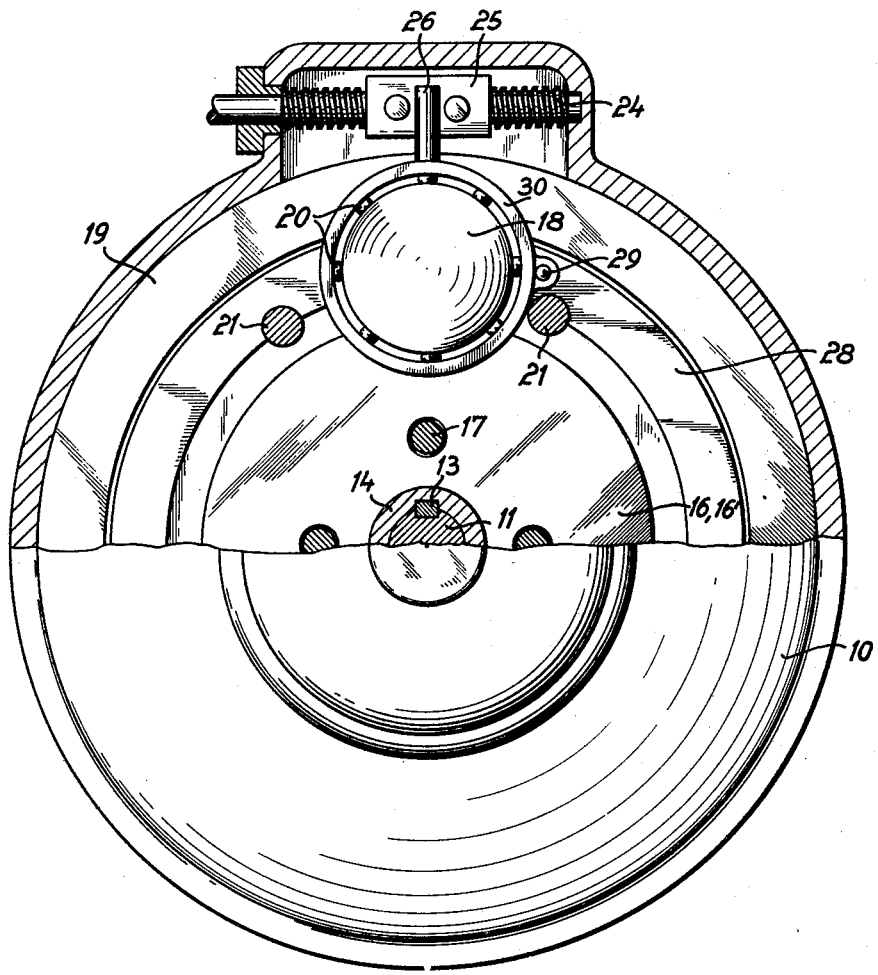
FIG. 2 is an end view of the drive partly in section.

Referring now to the drawings, the drive housing 10 has mounted therein the drive shaft 11 in radial bearings 12. A bushing 14 connected with the drive shaft 11 is mounted on the latter by means of an inserted feather or key 13, which bushing 14 is connected by means of a self-adjusting moment coupling 15 with a ring 16 of a pair of inner rings 16 and 16'. The total driving force is at first transmitted to the ring 16 of the inner rings 16 and 16'. One half of this driving force is transmitted as a transmitting force over a bolt 17 to the other ring 16' of the inner rings 16 and 16', so that each ring of the inner rings 16 and 16' transmits one half of the total driving force towards the rotary wheels 18.

The rotary wheel 18 is mounted freely rotatable in a swinging member 30 swingable upon the pivots 29 by means of intermediate rolling bodies 20, the pivots 29 sitting in a freely movable ring 28. The rotary wheel 18 engages outer rings 19 and 19' which are formed of two parts and transfers its peripheral force over bolts 21 to a driven disc 22 which carries the bolts 21, which driven disc 22 in turn is rigidly connected with the driven shaft 23.

The adjustment of the number of revolutions is brought about in such a manner that the prevailing force-transmitting radii between the inner rings 16 and 16' and the rotary wheels 18, on the one hand, and the outer rings 19, and 19' on the other hand, are changed by a radial swinging of the rotary wheels 18 in opposite direction. This radial movement of the rotary wheels 18 is achieved in such a manner, that the distance between the two outer rings 19 and 19' is changed relative to each other. For this purpose, the outer rings 19 and 19' are slightly turned by means of a threaded spindle 24 and a nut 25 engaging said spindle 24 over bolts 26 in such a manner, that for instances the left outer ring 19' is moved in axial direction by means of a moment coupling 27, which functions here practically as a threaded arrangement.

Figure 3:
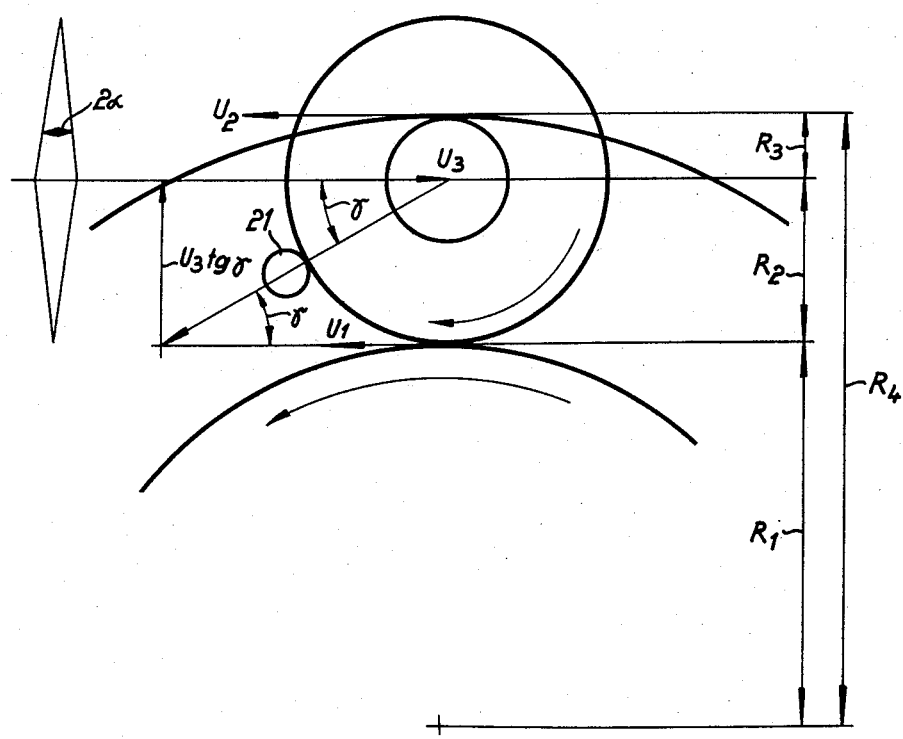
FIG. 3 is a schematic showing of the relation of the forces of the drive.

The coupling pressure between the inner rings 16, 16' and the rotary wheels 18 is independent from the prevailing adjusted position, yet is dependent upon the turning moment to be transmitted, since the driving radius $R_1$ remains constant. The situation is, however, different at the engaging points between the rotary wheels 18 and the outer rings 19, 19'. The peripheral force to be transmitted, and, thereby, the engaging pressure depends upon the driving moment and the adjusted position. FIG. 3 shows a scheme of such forces. The peripheral force $U_2$ has the same relation to the peripheral force $U_1$ as the relation between the radii $R_2$ and $R_3$.

$$U_2 = U_1 \cdot \frac{R_2}{R_3} \qquad U_1 + U_2 = U_3$$

That means, depending upon the adjusted position, a multiple of the peripheral force occurs at the engaging point between the rotary wheels 18 and the outer rings 19, 19', as compares with the force occurring between the rotary wheel 18 and the inner rings 16, 16'. Since the moment coupling 15 on the drive shaft 11 creates merely the engaging pressure for the peripheral force between the inner rings 16, 16' and the rotary wheels 18, no sufficient engaging force is present for the large peripheral force occurring between the rotary wheels 18 and the outer rings 19, 19'. Since the outer rings 19, 19' cannot adjust themselves freely, rather are used for the adjustment and are turned for this purpose by means of the threaded spindle 24, these rings 19, 19' cannot produce the required engaging pressure. For this reason the rotary wheels 18 transmit their peripheral force towards the driven disc 22 in such a manner that an outwardly directed radial component of the force is created, which pushes the planet gears outwardly, that means they produce in co-operation with the slim wedge angle of the double beveled rotary wheels 18 the required engaging pressure.

The rotary wheels 18 do not transfer their peripheral force over a swinging member 30, since in this case the ratio of the forces would also change with changing directions of rotation, rather they transmit their peripheral force to the bolts 21, which are secured to the driven disc 22 constituting the drive in such a manner, that an imaginary connecting line between the center point of the bolts 21 and the center point of the rotary wheels 18 forms a certain angle $\gamma$ with the tangent on the engaging radius between the rotary wheels 18 and the driven disc 22. Due to this angle $\gamma$, the force exerted upon the bolt 21 is divided into a tangential and a radial component. The radial component leads to an increase of the engaging force on the outer rings 19, 19', which is still increased due to the wedge effect of the double beveled rotary wheels 18. The angle $\gamma$ must now follow the following law:

wherein $\gamma$ is the angle formed between an imaginary connecting line connecting the center point of the bolt 21 and the center point of the rotary wheels 18 and the tangent on the engaging radius between the rotary wheels 18 and the driven disc 22; $\alpha$ is the half of the wedge angle of the rotary wheels 18; $\mu$ is the friction coefficient between the planet gears and the inner and outer rolling gears; $x$ is the ratio of the radii $R_2:R_3$. The radius $R_2$ is the changeable rotary wheel radius of engagement between the rotary wheel 18 and the inner rings 16, 16′. $R_3$ is the changeable rotary wheel radius between the rotary wheels 18 and the outer rings 19, 19′.

$$\operatorname{tg} \gamma = \frac{\sin \alpha}{\mu}\left(\frac{x-1}{x+1}\right); x = \frac{R_2}{R_3}$$

For the ratio $R_2:R_3=1$, $\gamma=0$. The following example demonstrates that this law may be performed in practice:

$$\alpha = 4°; \mu = 0.062, X = R_2:R_3 = 3$$

For this case, $\gamma = 29.5°$.

While I have disclosed one embodiment of the present invention, it is to be understood that this embodiment is given by example only and not in a limiting sense, the scope of the present invention being determined by the objects and the claims.

I claim:

1. A friction wheel drive comprising a double beveled rotary wheel, causing upon rotation a rotary moment, two inner and two outer rings engaging said rotary wheel, said inner rings constituting driving members and said outer rings constituting reaction members, the engagement between said outer rings and said wheel bringing about a transmitting force therebetween, a housing, a swinging member surrounding said rotary wheel, a freely movable ring pivotally supporting said swinging member and, thereby, said rotary wheel, a drive shaft, and a driven shaft, said inner rings operatively connecting said drive shaft with said rotary wheel, a driven disc operatively connected with said driven shaft, bolts secured to said driven disc, said bolts engaging said swinging member, so that a radial component of said transmitting force between said wheel and said outer rings dependent upon said rotary moment is created, in addition to the tangential engagement of said reaction members, in order to increase the closed system of mechanical forces between said rotary wheels and said outer rings.

2. The friction wheel drive, as set forth in claim 1, which includes means for supporting said outer rings relative to said housing, thereby exerting an axial engagement force dependent upon the amount of the reaction rotary moment, and means for relative rotation of said outer rings in order to change the speed of rotation of said reaction members.

References Cited in the file of this patent

UNITED STATES PATENTS

| | | |
|---|---|---|
| 1,770,408 | Jacobsen | July 15, 1930 |
| 2,205,768 | Pearce | June 25, 1940 |
| 2,209,497 | Winger et al. | July 30, 1940 |